(12) United States Patent
Cottard et al.

(10) Patent No.: US 8,345,933 B2
(45) Date of Patent: Jan. 1, 2013

(54) PROCEDURE FOR IDENTIFYING A PERSON BY EYELASH ANALYSIS

(75) Inventors: Martin Cottard, Paris (FR); Stéphane Gentric, Paris (FR)

(73) Assignee: Morpho, Paris (FR)

( * ) Notice: Subject to any disclaimer, the term of this patent is extended or adjusted under 35 U.S.C. 154(b) by 1055 days.

(21) Appl. No.: 12/298,599

(22) PCT Filed: Apr. 6, 2007

(86) PCT No.: PCT/EP2007/003141
§ 371 (c)(1),
(2), (4) Date: Oct. 27, 2008

(87) PCT Pub. No.: WO2007/124845
PCT Pub. Date: Nov. 8, 2007

(65) Prior Publication Data
US 2009/0097715 A1    Apr. 16, 2009

(30) Foreign Application Priority Data
Apr. 28, 2006 (FR) ..................... 06 03895

(51) Int. Cl.
G06K 9/00 (2006.01)
(52) U.S. Cl. ...................... 382/115; 382/218
(58) Field of Classification Search ............... 382/115, 382/117, 218
See application file for complete search history.

(56) References Cited

U.S. PATENT DOCUMENTS

| | | | |
|---|---|---|---|
| 6,424,727 B1 * | 7/2002 | Musgrave et al. | 382/117 |
| 6,546,121 B1 | 4/2003 | Oda | |
| 7,068,820 B2 * | 6/2006 | Nakaigawa et al. | 382/118 |
| 7,123,753 B2 * | 10/2006 | Takahashi et al. | 382/117 |
| 7,155,035 B2 * | 12/2006 | Kondo et al. | 382/117 |
| 7,436,987 B2 * | 10/2008 | Takano et al. | 382/117 |
| 7,593,550 B2 * | 9/2009 | Hamza | 382/117 |
| 7,773,091 B2 * | 8/2010 | Giron et al. | 345/582 |
| 7,878,653 B2 * | 2/2011 | Ichikawa et al. | 351/210 |
| 8,098,901 B2 * | 1/2012 | Hamza | 382/117 |
| 2005/0270386 A1 * | 12/2005 | Saitoh et al. | 348/239 |
| 2007/0211924 A1 * | 9/2007 | Hamza | 382/117 |
| 2009/0097715 A1 * | 4/2009 | Cottard et al. | 382/117 |
| 2010/0284576 A1 * | 11/2010 | Tosa | 382/117 |

FOREIGN PATENT DOCUMENTS

| | | |
|---|---|---|
| EP | 1018297 A1 | 7/2000 |
| EP | 1431810 A1 | 6/2004 |
| EP | 1431907 A1 | 6/2004 |

OTHER PUBLICATIONS

Sagem Défense Sécurite : "Offre de stage aeronautique: Identification d'une personne par analyse de ses cils.", Internet Article, Oct. 3, 2006, http://www.aerocontact.com/jobs/ac stg detail2.php?ID=2224 &PHPSESSID=2cleldb4a8d5b.

W-K Kong et al., Detecting Eyelash and Reflection for Accurate Iris Segmentation; International Journal of Pattern Recognition and Artificial Intelligence; World Scientific Publishing, Singapore; vol. 17, No. 6; Sep. 2003, pp. 1025-1034.

A. K. Bachoo et al., Texture detection for segmentation of iris images; SAICSIT 2005: Proceedings of the 2005 Annual Research Conference of the South African Institute of Computer Scientists and Information Technologists on IT Research in Developing Countries, 2005; p. 243; White River, South Africa.

* cited by examiner

*Primary Examiner* — Gregory M Desire
(74) *Attorney, Agent, or Firm* — Gerald E. Helget; Nelson R. Capes; Briggs and Morgan, P.A.

(57) ABSTRACT

A procedure for identifying a person with a data acquisition device (202) that is configured for capturing the image of their eyelashes (102, 104). The captured image is compared with eyelash images in a database.

10 Claims, 2 Drawing Sheets

PROCEDURE FOR IDENTIFYING A PERSON BY EYELASH ANALYSIS

CROSS REFERENCE TO RELATED APPLICATIONS

The present application is a national stage filing of and claims priority of International Patent Application No. PCT/EP2007/003141, filed Apr. 6, 2007 and French Application No. 06/03895 filed Apr. 28, 2006, the contents of which are hereby incorporated by reference in their entirety.

BACKGROUND OF THE INVENTION

The present invention concerns a method of identifying a person, a combined method of identifying a person and an acquisition device adapted to implement such methods. It finds an application in the field of biometric recognition and in particular in the field of identification by analysis of eyelashes.

Identification by biometric recognition is used for protecting installations such as for example buildings or machines or for obtaining the granting of rights such as for example the issue of an identity card, the payment of a pension, etc. This technology makes it possible to dispense with access codes or cards, which may be stolen or falsified. The use of this technology makes it possible to reinforce security since the probability that two persons have two identical biometrics is almost zero.

A method of identifying a person by analysing his iris is known, which is based on the conversion of the image of the iris into a template and the comparison of this template with reference templates stored in a database. The template issuing from the conversion is generated by an algorithm from the image of the iris and contains a set of information characteristic of the image of the iris. As with iris images, these templates are unique for each person.

The identification method begins with a step of capturing an image of the iris by means of an image taking sensor. The identification method then continues with a step of converting the image thus captured into a template and then a step of comparing the template with reference templates in a database and a decision step concerning the identity of the person from the result of the comparison step.

This identification method requires the captured image to be sharp and, when the image is not sufficiently sharp, there may be a rejection of the person although the latter ought to have been identified. It may also happen that the person wishing to be identified does not suitably orient his eye and therefore his iris with respect to the image-taking sensor.

SUMMARY OF THE INVENTION

An object of the present invention is to propose a method of identifying a person that does not have the drawbacks of the prior art and that in particular makes it possible to dispense with the positioning of the eye of the persons with respect to the image-taking sensor.

For this purpose, there is proposed a method of identifying a person by an acquisition device adapted to capture the image of the eyelashes of the said person, the method comprising, when the person is facing the said acquisition device:
a step of capturing an image of the eyelashes of at least one of the eyes of the person;
a step of comparing the features of the eyelashes of the image thus captured with the corresponding features of eyelash images in a database; and
a step of taking a decision concerning the identity of the person from the result of the said comparison step.

According to a particular embodiment, the features comprise the location of the roots of the eyelashes along the eyelid.

According to a particular embodiment, the features comprise the density of the eyelashes.

According to a particular embodiment, the features comprise the variations in the density of the eyelashes.

According to a particular embodiment, the features comprise the colour of the eyelashes.

Advantageously, between the capture step and the comparison step, the method comprises a step of modelling the eyelashes of the image by curves and the features comprise these curves.

The invention also proposes a combined method of identifying a person by means of an acquisition device adapted to capture the image of the eyelashes of the said person and the image of the iris of the person, the method comprising, when the person is facing the said acquisition device:
a step of capturing an image of the eyelashes of at least one of the eyes of the person;
a step of capturing an image of the iris of the person;
a first step of comparing the features of the eyelashes of the image of the eyelashes thus captured with the corresponding features of images of eyelashes in a database;
a step of converting the iris image thus captured into its template;
a second step of comparing the said template with reference templates in a database; and
a step of taking a decision concerning the identity of the person from a combination of the result of the said first comparison step and the result of the said second comparison step.

According to a particular embodiment, the combination of the result of the first comparison step and the result of the second comparison step is modified according to the value of at least one validity criterion.

According to a particular embodiment, the validity criterion is representative of the comparison between the sharpness of the image of the eyelashes and the sharpness of the image of the iris.

The invention also proposes an acquisition device adapted to implement an identification method according to one of the preceding variants and comprising:
capture means provided for capturing an image of the eyelashes of the person;
comparison means provided for comparing features of the eyelashes of the image thus captured with corresponding features of images of eyelashes in a database; and
decision-taking means provided for taking a decision with regard to the identity of the person from information supplied by the comparison means.

The invention also proposes a combined acquisition device adapted to implementing a combined identification method according to one of the above variants and comprising:
capture means provided for capturing an image of the eyelashes of the person;
capture means provided for capturing an image of the iris of the person;
conversion means provided for converting the image of the iris into a template;
first comparison means provided for comparing features of the eyelashes of the image of the eyelashes thus captured with eyelash images in a database;
second comparison means provided for comparing the said template with reference templates in a database; and decision-taking means provided for taking a decision with regard to the identity of the person from a combination of information supplied by the first comparison means and information supplied by the second comparison means.

BRIEF DESCRIPTION OF THE DRAWINGS

The features of the invention mentioned above, as well as others, will emerge more clearly from a reading of the following description of an example embodiment, the said description being given in relation to the accompanying drawings, among which:

FIG. 1 depicts an eye 100 of a person comprising an iris 106, lower lashes 104 and upper lashes 102.

DETAILED DESCRIPTION OF ILLUSTRATIVE EMBODIMENTS

The eyelashes 102, 104 of one person are different from those of another person. Thus the eyelashes 102, 104 of one person bear certain features that are remarkable and that make it possible to differentiate the eyelashes 102, 104 of one person from the eyelashes of another person using an image of these eyelashes 102, 104.

Figure 3:
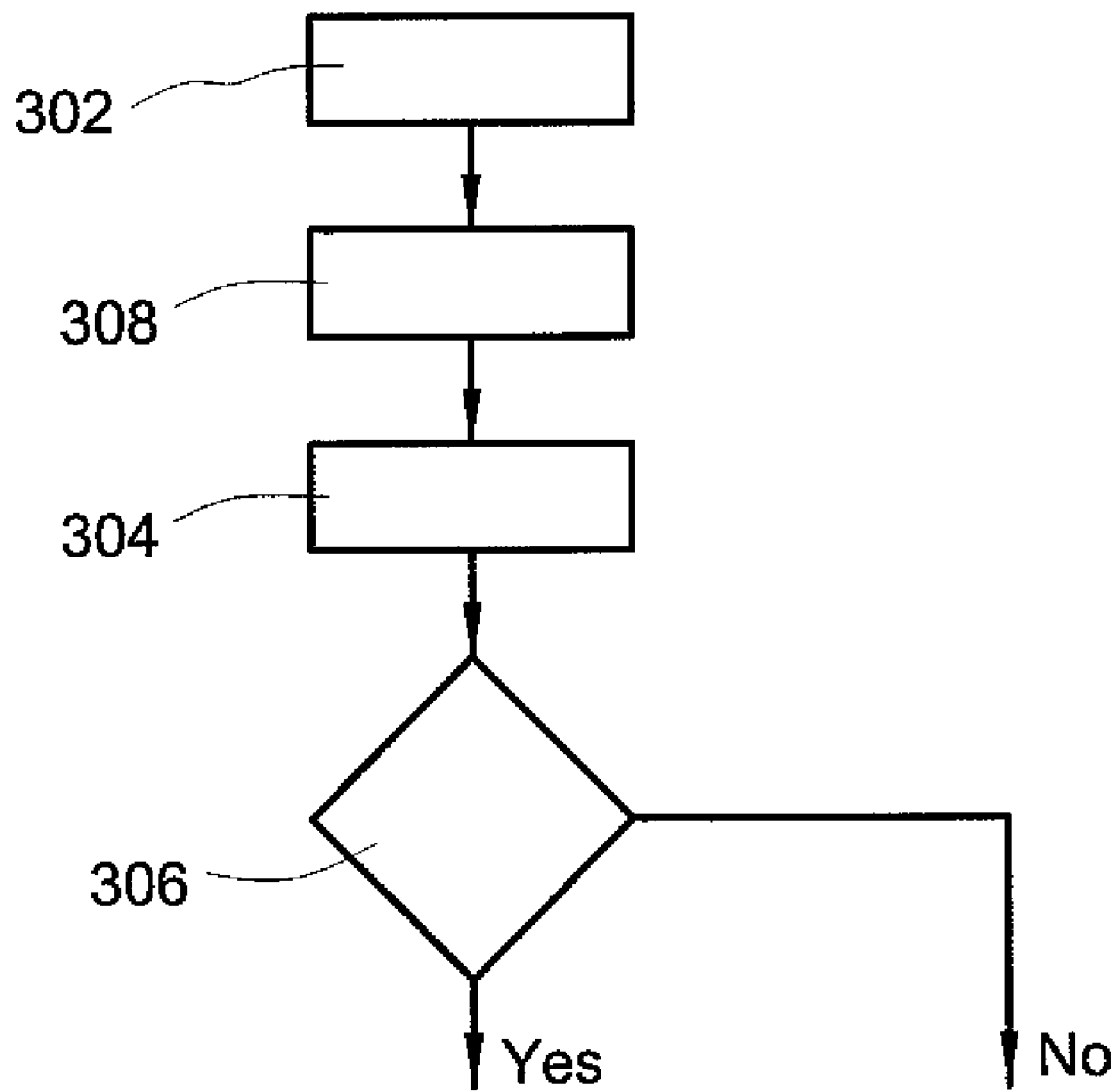
FIG. 3 depicts an algorithm of an identification method according to the invention.

FIG. 3 depicts an algorithm of a method 300 of identifying a person by means of an acquisition device adapted to capture the image of the eyelashes 102, 104 of the person. The identification method 300 thus comprises, when the person is facing the said acquisition device:
- a step 302 of capturing an image of the eyelashes 102, 104 of the person;
- a step 304 of comparing the features of the eyelashes 102, 104 of the image of the eyelashes 102, 104 thus captured with the corresponding features of images of eyelashes in a database; and
- a step of taking a decision 306 concerning the identity of the person from the result of the comparison step.

The fact that only the images of the eyelashes 102, 104 are analysed makes it possible to be free of the position of the iris 106 unlike the identification methods of the prior art that are based on the analysis of the iris 106. This is because, even if the person wishing to be identified does not place his iris correctly, his head and therefore his eyelashes are correctly positioned in front of the acquisition device, for example because of the presence of positioning means that allow the correct positioning of the head.

In addition, the eyelashes 102, 104 are elements varying during the life of the person, unlike a fingerprint or an iris 106, which are constant. Thus it may be preferable to use a method 300 of identification by analysis of the eyelashes 102, 104 when the lasting nature of the data in the database cannot be envisaged, that is to say when these data must become obsolete at the end of a certain length of time. This may be the case when the identification method 300 is used for entry into a temporary exhibition, or for identifying children, for example the entrance to a canteen. Thus, over time, the morphology of the eyelids and eyelashes modifies little by little and the data in the database are not longer representative of the persons. And thus, even in the event of intrusion into the database, the data that might be pirated become without interest over time.

The features of the eyelashes 102, 104 may comprise various elements, a non-exhaustive list of which is given below, and the features of the eyelashes 102, 104 may include one or more of these elements.

One of these elements may consist of the location of the roots of the eyelashes 102, 104 along the eyelid. This is because it is possible to analyse the position of the roots of the eyelashes 102, 104 by analysing the image captured and to derive therefrom their location along the eyelids. This location may be a relative location, that is to say the position of the eyelashes 102, 104 with respect to one another, or an absolute location, that is to say the global form of all the eyelashes 102, 104 with respect to a given reference frame. According to a particular embodiment, the origin of the reference frame is one of the corners of the eye and the reference axes are a horizontal axis and a vertical axis.

Another of these elements may consist of the density of the eyelashes 102, 104. This density may be obtained for example by approximation of the number of eyelashes 102, 104 on the eyelids and calculation of the density, or by measurement of the grey level of the image captured and calculation of the density, or by any other suitable method. This density may be a global density, that is to say it is calculated on the whole of the eye. This density may be a local density, that is to say that only some of the eyelashes 102, 104 are taken into account for determining the density. For example, it is possible to take into account only the upper eyelashes 102, or only the lower eyelashes 104 or only the left-hand or right-hand part of these eyelashes 102, 104.

Another of these elements may consist of the variation in the density of the eyelashes 102, 104. This variation may be observed along the eyelid and quantified, for example, by analysing the grey level of the image captured.

Another of these elements may consist of the colour of the eyelashes 102, 104. This is because the colour of the eyelashes 102, 104 of each person is distinguished from the colour of the eyelashes of another person and measuring this colour makes it possible to differentiate the persons.

It is also possible to model the eyelashes 102, 104 of the image by curves of the spline, polynomial or other type. A step 308 of modelling the eyelashes 102, 104 is then inserted between the capture step 302 and the comparison step 304 and the features comprise these curves.

In order to analyse these various features, it is possible to use graphical analysis software making it possible to recognise, on the image, the features sought.

It is also possible to combine the method 300 of identifying the person by his eyelashes 102, 104 with a method of identifying the person by his iris 106.

Such a combined method of identifying a person by means of an acquisition device adapted to capture the image of the eyelashes 102, 104 of the person and the image of the iris 106 of the person, comprises, when the person is facing the acquisition device:
- a step of capturing an image of the eyelashes 102, 104 of at least one of the eyes 100 of the person;
- a step of capturing an image of the iris 106 of the person;
- a first step of comparing the features of the eyelashes 102, 104 in the image of the eyelashes thus captured with the corresponding features of images of eyelashes in a database 206;
- a step of converting the iris image thus captured into its template;
- a second step of comparing the said template with reference templates in a database; and a step of taking a decision concerning the identity of the person from a combination of the result of the said first comparison step and the result of the said second comparison step.

Such a combined method of identifying a person makes it possible to determine the identity of the person by combining the results of the two comparisons.

This comparison can be based on one or more validity criteria and the combination of the result of the first comparison step and the result of the second comparison step may be modified according to the value of the validity criterion or criteria.

According to a particular embodiment, the validity criterion is representative of the comparison between the sharpness of the image of the eyelashes 102, 104 and the sharpness of the image of the iris 106. In this embodiment, and according to the value of the validity criterion, the combination may then consist for example of taking into account the result of the first comparison step or taking into account the result of the second comparison step.

In the case where the validity criterion is representative of the comparison between the sharpness of the image of the eyelashes 102, 104 and the sharpness of the image of the iris 106, if the sharpness of the image of the eyelashes is better than the sharpness of the image of the iris, the combination consists of taking account of the result of the first comparison step and, if the sharpness of the image of the iris is better than the sharpness of the image of the eyelashes, the combination consists of taking account of the result of the second comparison step.

In the case of simultaneous use of the two methods, the method 300 of identification by the eyelashes 102, 104 can be used in order to confirm or invalidate the result of the method of identification by iris when this result is subject to caution.

The various decision-taking steps described above may, for example, be based on analyses of similarity between the images/templates of the eye 100 to be identified and the reference images/templates in the database 206. At each comparison step, a score representing the similarity is given and, depending on whether this score is higher or lower than a reference value, the person is considered to be identified or not.

Figure 1:
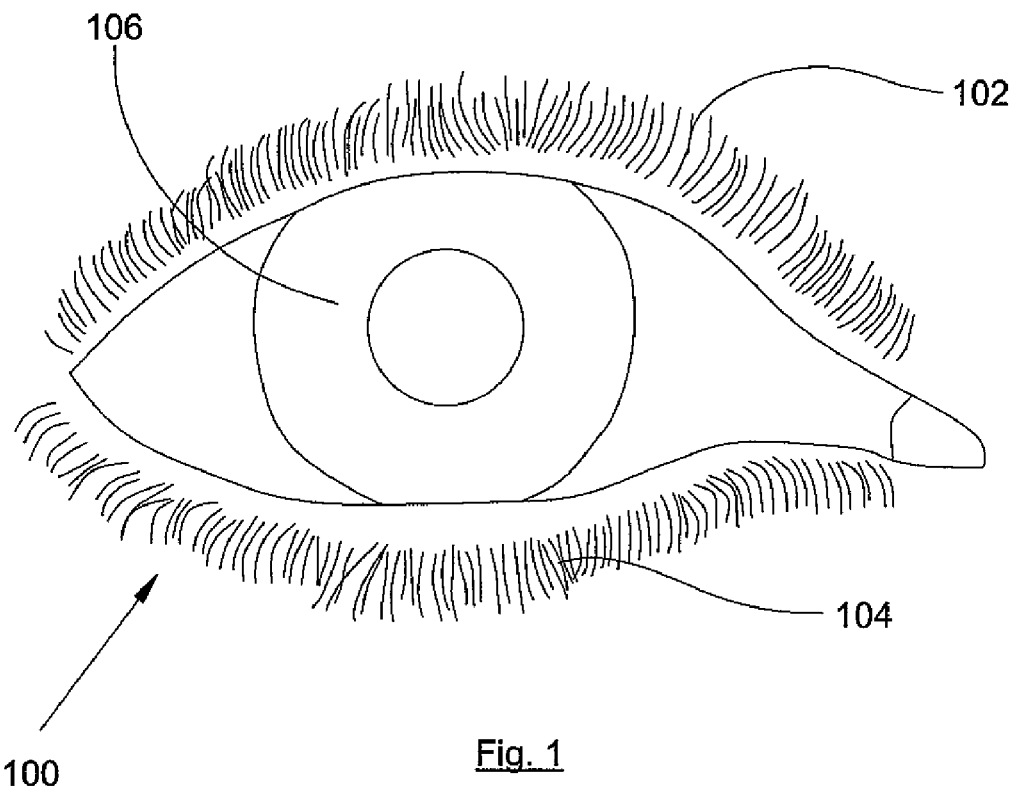
FIG. 1 depicts an eye, the eyelashes of which must be recognised.
Figure 2:
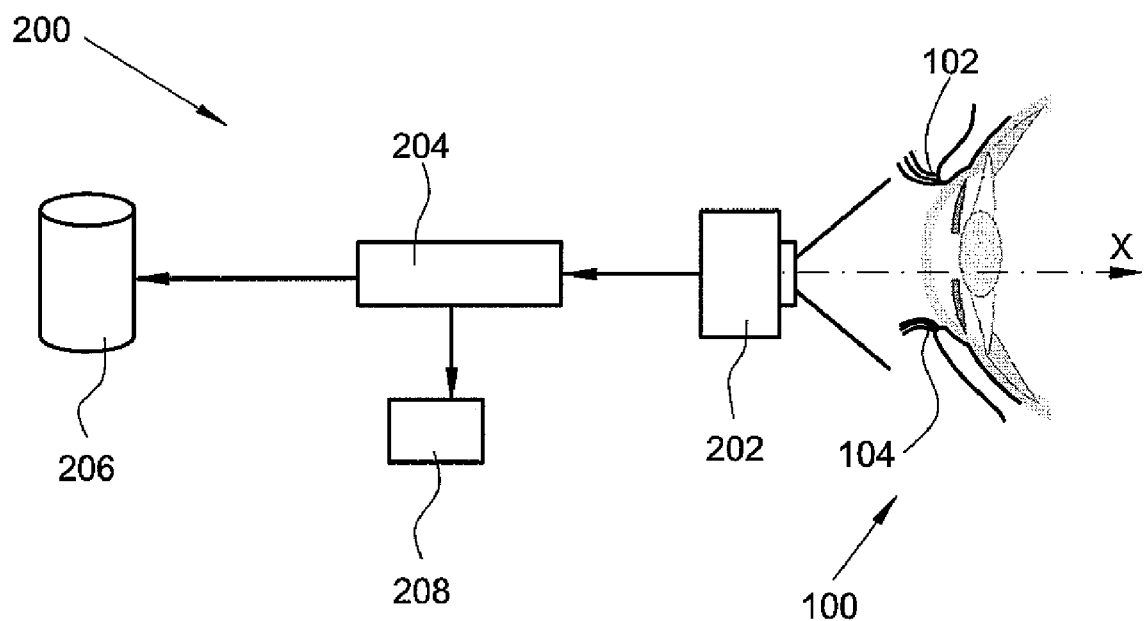
FIG. 2 depicts an acquisition device according to the invention.

FIG. 2 depicts an acquisition device 200 comprising:
capture means 202, for example of the CCD type, and provided for capturing an image of the eyelashes 102, 104 of the person to be identified;
control and comparison means 204 connected to the image sensor 202 and provided for controlling the capture of the image of the eyelashes 102, 104 and for comparing the features of the eyelashes 102, 104 in the image of the eyelashes 102, 104 thus captured with corresponding features of images of eyelashes in a database 206; and
decision-taking means 208 provided for taking a decision with regard to the identity of the person from information supplied by the comparison means 204.

A combined acquisition device provided for implementing the combined method of identifying a person comprises:
capture means provided for capturing an image of the eyelashes 102, 104 of the person;
capture means provided for capturing an image of the iris 106 of the person;
conversion means provided for converting the image of the iris 106 into a template;
first comparison means provided for comparing features of the eyelashes 102, 104 of the image of the eyelashes 102, 104 thus captured with corresponding features of images of eyelashes in a database;
second comparison means provided for comparing the said template with reference templates in a database; and
decision-taking means provided for taking a decision with regard to the identity of the person from a combination of information supplied by the first comparison means and information supplied by the second comparison means.

The combination can be any function combining the information supplied by the first comparison means and the information supplied by the second comparison means, as explained above.

Preferably the control and comparison means and the decision-taking means are collected together in a single calculation unit and are implemented by software.

The use of one of the identification methods described above requires a recording phase during which an image of the eyelashes 102, 104 and possibly an image of the iris 106 are captured and stored in the database 206. The database 206 then references all the persons who can be identified by one of the identification methods described.

Naturally the present invention is not limited to the examples and embodiments described and depicted but is capable of many variants accessible to persons skilled in the art.

For example, the methods described above are particularly described on the capture of the image of the eyelashes of a single eye, but they can apply in the same way in the case where the image captured represents the eyelashes of both eyes. It is also possible to compare the features of the eyelashes of each eye and to combine the results of these comparisons in order to take a decision with regard to the identity of the person.

The invention claimed is:

1. A method (300) of identifying a person by an acquisition device (202) adapted to capture the image of the eyelashes (102, 104) of the person, the method being implemented in an acquisition device and comprising:
    (a) placing the person to face the acquisition device (202);
    (b) a step (304) of capturing on a capture means of said acquisition device an image of the eyelashes (102, 104) of at least one of the eyes (100) of the person;
    (c) a step (304) of comparing on a control and comparison means of said acquisition device the features of the eyelashes (102, 104) of the image thus captured with the corresponding features of eyelash images in a database (206), where the features comprise the variation in the density of the eyelashes (102, 104); and
    (d) a step (306) of taking on a decision-taking means of said acquisition device a decision concerning the identity of the person from the result of the said comparison step.

2. The identification method (300) of claim 1, where the features comprise also the location of the roots of the eyelashes (102, 104) along the eyelid.

3. The identification method (300) of claim 1, where the features comprise also the density of the eyelashes (102, 104).

4. The identification method (300) of claim 1, where the features comprise also the colour of the eyelashes (102, 104).

5. The identification method (300) of claim 1, comprising a step between the capture step (302) and the comparison step (304) where:
    (a) the eyelashes (102, 104) of the image are modelled by curves; and
    (b) the features comprise also the curves.

6. An acquisition device (200) adapted to implement the method according of claim 1 and comprising:
    (a) capture means (202) provided for capturing an image of the eyelashes (102, 104) of the person;

(b) comparison means (204) provided for comparing the variation in the density of the eyelashes (102, 104) of the image thus captured with the corresponding variation in the density of images of eyelashes in a database (206); and (c) decision-taking means (208) provided for taking a decision with regard to the identity of the person from information supplied by the comparison means (204).

7. A combined method of identifying a person by means of an acquisition device adapted to capture the eyelashes (102, 104) of the person and the image of the iris (106) of the person, the method being implemented in an acquisition device and comprising:

(a) placing the person to face the acquisition device;

(b) a step of capturing an image of the eyelashes (102, 104) of at least one of the eyes (100) of the person;

(c) a step of capturing an image of the iris (106) of the person;

(d) a first step of comparing the features of the eyelashes (102, 104) of the image of the eyelashes thus captured with the corresponding features of images of eyelashes in a database (206), where the features comprise the variation in the density of the eyelashes (102, 104);

(e) a step of converting the iris image thus captured into its template;

(f) a second step of comparing the template with reference models in a database; and (g) a step of taking a decision concerning the identity of the person from a combination of the result of the first comparison step and the result of the second comparison step.

8. The combined identification method of claim 7, where the combination of the result of the first comparison step and the result of the second comparison step is modified according to the value of at least one validity criterion.

9. The combined identification method of claim 8, where the validity criterion is representative of the comparison between the sharpness of the image of the eyelashes and the sharpness of the image of the iris.

10. A combined acquisition device adapted to implement the method of claim 7 comprising:

(a) a capture means provided for capturing an image of the eyelashes (102, 104) of the person;

(b) a capture means provided for capturing an image of the iris (106) of the person;

(c) a conversion means provided for converting the image of the iris (106) into a template;

(d) a first comparison means provided for comparing features of the eyelashes (102, 104) of the image of the eyelashes (102, 104) thus captured with eyelash images in a database;

(e) a second comparison means provided for comparing the template with reference templates in a database; and (f) a decision-taking means provided for taking a decision with regard to the identity of the person from a combination of information supplied by the first comparison means and information supplied by the second comparison means.

* * * * *